US011173564B2

(12) United States Patent
Bunker et al.

(10) Patent No.: US 11,173,564 B2
(45) Date of Patent: Nov. 16, 2021

(54) SMART GRID WELDING SYSTEM (71) Applicant: ILLINOIS TOOL WORKS INC., Glenview, IL (US)

(72) Inventors: Thomas A. Bunker, Black Creek, WI (US); Bruce Patrick Albrecht, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 145 days.

(21) Appl. No.: 16/163,296

(22) Filed: Oct. 17, 2018

(65) Prior Publication Data
US 2019/0084072 A1 Mar. 21, 2019

Related U.S. Application Data (63) Continuation of application No. 14/792,246, filed on Jul. 6, 2015, now Pat. No. 10,144,084, which is a
(Continued)

(51) Int. Cl.
B23K 9/00 (2006.01)
B23K 9/10 (2006.01)

(52) U.S. Cl.
CPC ......... B23K 9/1043 (2013.01); B23K 9/1056 (2013.01); B23K 9/1075 (2013.01)

(58) Field of Classification Search
CPC . B23K 5/00; B23K 9/00; B23K 10/00; B23K 11/00; B23K 13/00; B23K 15/00
(Continued)

(56) References Cited

U.S. PATENT DOCUMENTS 5,031,690 A 7/1991 Anderson
5,551,508 A 9/1996 Lim
(Continued)

FOREIGN PATENT DOCUMENTS

DE 20313048 2/2004
GB 1276454 6/1972
(Continued)

OTHER PUBLICATIONS

International Search Report for application No. PCT/US2011/022139 dated Apr. 29, 2011.
(Continued)

Primary Examiner — Michael A Laflame, Jr.
(74) Attorney, Agent, or Firm — McAndrews, Held & Malloy, Ltd.

(57) ABSTRACT

Welding system and method permit exchange of data with Smart Grid monitors and/or controllers. The welding systems include a welding power supply configured to convert power between the power grid and the welding power supply. A grid interface cooperates with control circuitry to transmit data to and/or from the grid monitors and/or controllers on the grid side. The control circuitry may control operation of the welding power supply based upon data from the grid. The system may include power generation devices (e.g., engine-drive generators) and energy storage devices (e.g., batteries). The control circuitry may control operation of such devices, the exchange of power between them, and the draw of power from the grid or the application of power to the grid based upon the data exchanged with the grid monitors and/or controllers.

20 Claims, 3 Drawing Sheets

Related U.S. Application Data continuation of application No. 13/011,586, filed on Jan. 21, 2011, now Pat. No. 9,089,922.

(60) Provisional application No. 61/297,344, filed on Jan. 22, 2010.

(58) Field of Classification Search
USPC .......................................... 219/121.11–162
See application file for complete search history.

(56) References Cited

U.S. PATENT DOCUMENTS

| | | | |
|---|---|---|---|
| 5,601,741 | A | 2/1997 | Thommes |
| 5,684,450 | A | 11/1997 | Brown |
| 5,929,750 | A | 7/1999 | Brown |
| 5,933,071 | A | 8/1999 | Brown |
| 6,144,292 | A | 11/2000 | Brown |
| 6,172,597 | B1 | 1/2001 | Brown |
| 6,240,742 | B1 | 6/2001 | Kaufman |
| 6,282,405 | B1 | 8/2001 | Brown |
| 6,624,388 | B1 | 9/2003 | Blankenship et al. |
| 6,673,479 | B2 | 1/2004 | McArthur |
| 6,756,776 | B2 | 6/2004 | Perkinson |
| 6,777,649 | B2 | 8/2004 | Reynolds |
| 6,818,860 | B1 | 11/2004 | Stava |
| 6,885,674 | B2 | 4/2005 | Hunt |
| 6,985,715 | B2 | 1/2006 | Lee |
| 6,993,317 | B2 | 1/2006 | Belsak |
| 7,049,547 | B1 | 5/2006 | Brunner |
| 7,208,697 | B2 | 4/2007 | Blankenship |
| 7,307,357 | B2 | 12/2007 | Kopp |
| 7,795,840 | B2 | 9/2010 | Vogel |
| 8,224,881 | B1 | 7/2012 | Spear |
| 2006/0037953 | A1 | 2/2006 | Matthews |
| 2007/0135972 | A1 | 6/2007 | Jacobson |
| 2007/0181547 | A1 | 8/2007 | Vogel |
| 2007/0278993 | A1 | 12/2007 | Vogel |
| 2008/0006616 | A1 | 1/2008 | Hutchison |
| 2008/0083705 | A1 | 4/2008 | Peters |
| 2008/0215200 | A1 | 9/2008 | Toth |
| 2008/0247318 | A1 | 10/2008 | Yechuri |
| 2008/0258682 | A1 | 10/2008 | Li |
| 2008/0314885 | A1 | 12/2008 | Hutchison |
| 2008/0319893 | A1 | 12/2008 | Mashinsky |
| 2009/0008368 | A1 | 1/2009 | Beeson |
| 2009/0008374 | A1 | 1/2009 | Fosbinder |
| 2009/0034419 | A1 | 2/2009 | Flammer |
| 2009/0057285 | A1 | 3/2009 | Bashore |
| 2009/0063228 | A1 | 3/2009 | Forbes |
| 2009/0066290 | A1 | 3/2009 | Altekruse |
| 2009/0088907 | A1 | 4/2009 | Lewis |
| 2009/0281674 | A1 | 11/2009 | Taft |
| 2009/0322253 | A1 | 12/2009 | Buelowll |
| 2009/0326728 | A1 | 12/2009 | Chrisop |
| 2011/0180522 | A1* | 7/2011 | Bunker ................ B23K 9/1043 219/130.21 |

FOREIGN PATENT DOCUMENTS

| | | |
|---|---|---|
| GB | 1278454 | 6/1972 |
| JP | 1189435 | 7/1989 |
| JP | 2000198349 | 7/2000 |
| WO | 2007061622 | 5/2007 |

OTHER PUBLICATIONS

International Search Report for application No. PCT/US2010/056817 dated Feb. 21, 2011.

International Search Report for application No. PCT/US2010/056854 dated Feb. 21, 2011.

\* cited by examiner

SMART GRID WELDING SYSTEM

CROSS REFERENCE TO RELATED APPLICATIONS

This application claims priority to, and is a continuation of, co-pending U.S. application Ser. No. 14/792,246, entitled "Smart Grid Welding System," having a filing date of Jul. 6, 2015, which claims priority to, and is a continuation of, U.S. patent application Ser. No. 13/011,586 (now U.S. Pat. No. 9,089,922), entitled "Smart Grid Welding System," having a filing date of Jan. 21, 2011, which is a non-provisional patent application of U.S. Provisional Patent Application No. 61/297,344, entitled "Smart Grid Hybrid Welding System," having a filing date of Jan. 22, 2010, all of which are incorporated herein by reference in their entirety.

BACKGROUND

The present invention relates generally to welding, heating and cutting systems and to their operation in connection with Smart Grid connectivity and data exchange.

Welding systems have become virtually ubiquitous throughout industry. Such systems are currently used in all industries, including manufacturing, physical plant construction, ship building, pipeline construction, maintenance and repair, etc. While variations exist in the system configurations and their modes of operation, many such systems are strictly electrical and rely upon the creation of a welding arc to melt and fuse base metals and/or adder metals, typically in the form of rods and wires. Currently available systems include, for example, gas metal arc welding (GMAW) systems, shielded metal arc welding (SMAW) systems, etc. In conventional terms, such systems may include so-called stick welders, metal inert gas (MIG) welders, tungsten inert gas (TIG) welders, etc. It should be noted that in the present context, although references made to "welding" systems and operations, the term here is intended to cover similar and related processes, such as heating (e.g., induction heating used to support welding operations), and cutting (e.g., plasma torch systems).

Welding systems that rely on the creation of a welding arc have been refined to operate efficiently and effectively for joining metals in desired joints, but nevertheless requires substantial amounts of power. This power is typically provided from the power grid when the systems are connected to the grid (e.g., plugged in). However, other power sources are also common, however, including engine-driven generators, batteries, and the use of alternative sources, such as fuel cells, super capacitors, etc. have been proposed. In many contexts, the welding systems are designed to regulate the conversion and delivery of power based upon the onset and termination of welding arcs (or heating in the case of heating systems, or plasma arc creation in the case of plasma arc cutting systems). When connected to the grid, these systems may represent substantial loads. Moreover, the systems may alter the power factor of the connected infrastructure, requiring correction for efficient operation. However, to date, little or no effort has been invested in intelligently coordinating operation of welding systems with the grid, or the coordination of alternative power sources from which the welding systems may draw the needed power with power from the grid.

Recent developments in power production and distribution have focused on the establishment of a so-called "Smart Grid". While the project is still evolving in definition and scope, and will certainly require years for full implementation, the concept includes the creation of an interactive power generation and distribution infrastructure in which data systems enable closer coordination of power production and loads. It is hoped that such efforts will result in a power grid that is more reliable, efficient, and balanced.

There is a need, at present, for improvements in welding systems that will be capable of cooperating with the Smart Grid infrastructure such that the significant loads represented by such systems can be at least partially managed along with other loads and power production assets that will be a part of the future Smart Grid deployment.

BRIEF DESCRIPTION

The present invention provides improved welding systems designed to respond to such needs. Here again, the term "welding systems" will be taken to include systems both for arc welding, as well as for heating and cutting of work pieces in conjunction with these types of operations. The invention offers an improvement to existing systems that may be deployed at various levels in the welding processes and that may be scaled to particular operations, production layouts, plant assets, etc. In a simple implementation, a conventional welding system may be coupled to a Smart Grid interface such that operation of the welding system may be coordinated with information exchanged with and external Smart Grid interface on a power production distribution side. Moreover, such Smart Grid interface circuitry may be incorporated into welding systems themselves to enable internal monitoring and control. Still further, the monitoring and control functions may be deployed at a production area level, a plant level or a business level to manage multiple welding assets and to coordinate their operation. The invention also allows for the intelligent coordination of both welding system loads, and the production and storage of power. These operations are available on a demand side (e.g., in a welding system, between welding systems, at a production area level, at a plant level, at a plant level, or at an enterprise level). So-called "demand response" is therefore afforded by the invention, allowing for more coordinated production, storage and usage of power in weld settings.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described more fully below, the systems, functionality and operation of welding equipment made available by the present invention provide for two-way data communication and where desired two-way power flow between welding systems and the power grid. In terms of the loads applied to the grid by welding and similar operations, this may allow for appropriate communication and timing of the onset and termination of welding operations. It may also allow for the planning of operations, scheduling of welding-based production operations, and the monitoring of power usage during such operations. Similarly, when welders or welding systems, or even production areas or entire production facilities include power generation capabilities, control of these assets can be based upon such factors as the availability of power from the grid, cost of power from the grid, peak and off-peak utilization, etc. In short, because of welding and similar operations may represent a substantial load that may suddenly draw from the grid, the ability to communicate parameters from a Smart Grid monitoring or control entity and a welding operation will greatly facilitate coordination of power production and distribution both on the grid side and on the welder side.

It should also be noted that the systems, components and functionality described below are intended to be compatible with existing and future-developed Smart Grid standards, particularly those established under the direction of the United States National Institute of Standards and Technology (NIST), the Grid Wise Architecture Counsel, the United States Department of Energy, as well as other organizations that are and will become standards-setting bodies, such as the American National Standards Institute (ANSI), the Institute of Electrical and Electronics Engineers (IEEE) and the ZigBee Alliance. Such standards do and will call for the measurement of certain electrical parameters of loads and power generation equipment, the communication of such parameters to grid-side providers, the communication of information, such as power availability, power factor needs, pricing, etc. from such providers, as well as for the extraction of power from the power grid and the application of generated power to the power grid, such as by welding systems, generators associated with welding systems, storage devices, etc. Moreover, it is contemplated that at least some of this functionality will be performed automatically, without operator intervention, while other aspects may be based upon input by a particular welding operator, production management, plant management, etc.

Figure 1:
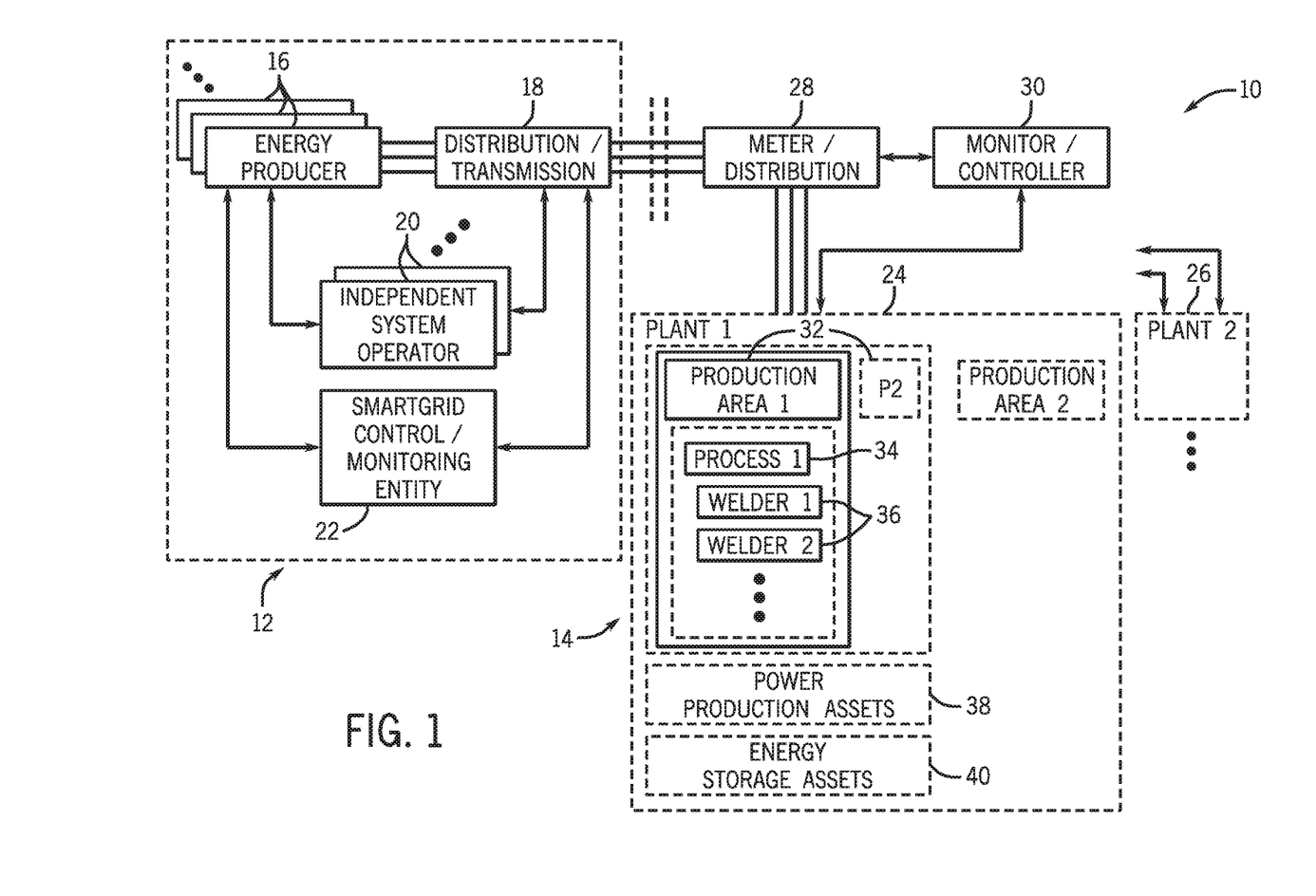
FIG. 1 a diagrammatical overview of a Smart Grid welding system designed to cooperate with Smart Grid monitoring and control components on a power production side.

Turning now to the drawings, and referring first to FIG. 1, a Smart Grid welding system 10 is illustrated diagrammatically. The welding system is designed to receive power from the power grid 12 and includes a welding production facility designated generally by the reference 14. As will be appreciated by those skilled in the art, the power grid 12 will include a range of energy producers 16 that produce electrical power from a variety of resources and applies the power to the grid distribution and transmission infrastructure 18. In general, the producers may produce the power based upon any available technologies, such as fossil fuels, hydroelectric power generation, wind energy, photovoltaic devices (e.g., solar), fuel cells, etc. The producers will condition the power, typically generated in three-phase, and provide the power to the distribution and transmission infrastructure 18 through which it is delivered to all consumers and users. In the Smart Grid implementation illustrated, one or more independent system operators 20 will be active in the vicinity of the production facility 14, and may server to provide data to, receive data from, and coordinate with the facility for the usage and supply of power before, during and after welding operations. Moreover, a Smart Grid control/monitoring entity 22 may exist separately, such as a governmental or quasi-governmental authority tasked with the monitoring of power quality, the assurance of grid reliability, etc.

In the illustration of FIG. 1, three-phase power is illustrated as being distributed to the production facility 14, although power could be distributed to a facility in single-phase form. In the United States, for example, three-phase power is delivered at 60 Hz, although other standards may be accommodated by the system. The incoming power is received by a metering and distribution infrastructure 28 on the production facility side. This equipment allows for the conditioning of incoming power, stepping up or stepping down of voltage levels, and so forth for servicing the production facility. Moreover, the metering and distribution infrastructure is coupled to one or more monitor/controllers 30 which allow for sensing, storing, and communicating data regarding the power needs and power utilization, both to and from the facility. In a presently contemplated embodiment, the monitor/controller 30 may be capable of communicating data over the power lines, although other technologies may be envisaged, such as separate data transmission wiring, wireless data transmission, etc. It should also be noted that the metering and distribution infrastructure 28 may allow for the conditioning of outgoing power from the facility, where such power is available and suitable for application to the grid.

The production facility 14 illustrated in FIG. 1 may include one or multiple plants, as indicated by reference numeral 24 and 26. In general, these plants may be at the same or different locations, and coordinated utilization of power, loading of the grid, generation and storage of power on the production facility side may be coordinated between such plants. Also illustrated in FIG. 1, are a plurality of production areas, such as indicated by reference numeral 32. Such production areas may exist within a particular facility or plant, such as for specific types of manufacturing, assembly, subcomponent processing, etc. Within each production area, then, multiple processes may be carried out as indicated generally by reference numeral 34. Such processes may include welding, cutting, fitting up, grinding, heat treating, and machining, just to mention a few. Relevant to the present invention, at least one of the processes includes one or more welders as indicated by reference numeral 36. As discussed below, because welding operations may require substantial quantities of power, and may represent loads that come onto the system relatively quickly and terminate relatively quickly, coordination of their operation with other assets of the facility, as well as with the Smart Grid, information is useful in contributing to the stability of the grid, cost effective manufacturing, manufacturing planning, etc.

In the embodiment illustrated in FIG. 1, the production facility 14 also includes power production assets as well as energy storage assets, as indicated by reference numeral 38 and 40, respectively. The power production assets 38 may include any desired type of power generation equipment, such as engine-driven generators, fuel cells, conventional boilers or gas combustion power production equipment (e.g., turbines), wind generators, etc. Such assets may function continuously or as needed, as described more fully below. Energy storage assets 40 may similarly include any suitable technologies, such as batteries, capacitors, super capacitors, fly wheels, etc.

As will be appreciated by those skilled in the art, the electrical equipment, particularly welders 36, are coupled to an internal power distribution network within facility 14 (not represented). This facility infrastructure allows for the distribution of power to the loads, as well as for the protection of loads, the exchange of power between the grid and power production assets and energy storage assets, etc. In some production facilities, for example, one or more welders may be provided in a weld cell designed for the production of a specific part or family of parts. Such welders may include any suitable welding technology, such as stick welders, MIG welders, TIG welders, etc. As discussed above, although the term "welder" is utilized in connection with FIG. 1, such systems should be understood to include, and this term is intended to designate, not only welding equipment, but also heating systems, such as for heat treatment, cutting equipment, such as plasma cutters, etc, Because such equipment may use power supplies similar to or incorporated in welding power supplies, their power management may be similar to or identical to that described below. Finally, the welders included in the system may be of the type employed by a human operator or may be automated, such as robotically.

The system of FIG. 1 advantageously allows for monitoring of power utilization by operation of the welders, as well as control of demand, production and storage of power by the facility in connection with welding operations. As described more fully below, each of the welders will preferably include sensing circuitry, such as for detecting voltages, currents, power draw, etc. that can be used separately or collectively by the facility to maintain records of power utilization during welding operations. Further, such sensing circuitry allows for collecting information that can be used to advise the independent system operators and/or the Smart Grid control/monitoring entity and/or the energy producers and distributors of power needs, actual power utilization, etc. The data may also be used, such as by the monitor/controller 30 to coordinate the draw of power from the grid with power extracted from the power production assets 38 and the energy storage assets 40, such as to allow for accommodating the grid-available power or lack thereof, the variations in price of such power, the availability of power from the internal power production assets and energy storage assets, etc.

Figure 2:
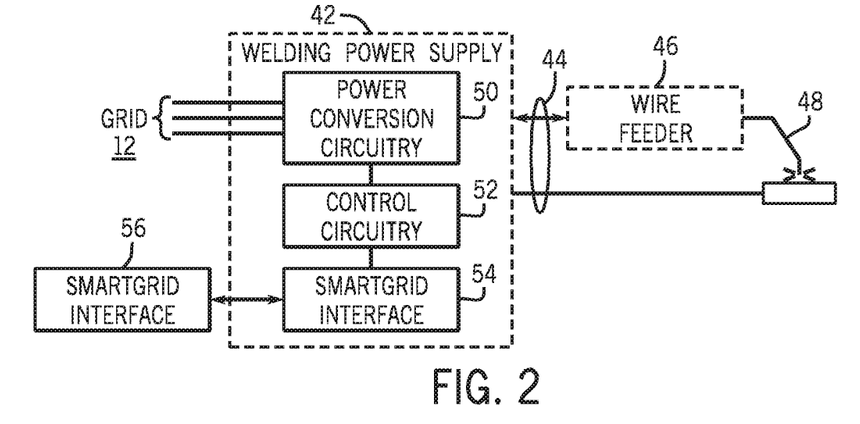
FIG. 2 is a diagrammatical representation of an exemplary welding system including a welding power supply designed to communicate with an external Smart Grid interface, and to coordinate and control the use of power based upon such communication.

FIG. 2 illustrates an exemplary welder of the type described above that may be included in a production facility. However, it should be understood that the welder shown in FIG. 2 may be completely stand-alone. That is, for larger production facilities of the type illustrated in FIG. 1, welders may report to a monitor/controller 30 for a process, a production area, a plant or an entire facility. Other contexts, however, will allow for Smart Grid interoperability in a single-user context, or for multiple welders operating independently or quasi-independently.

The system illustrated in FIG. 2 is coupled to the grid 12 as discussed above, and may or may not be part of a more extensive manufacturing operation. The system comprises a welding power supply 42 that outputs welding power via welding cables 44. A welding cable may be coupled to a wire feeder 46, such as for a MIG system, although in other systems the welding cable may be directly coupled to a torch 48, such as for stick, TIG or other types of welding. The welding power supply, in some aspects may be conventional, such as including power conversion circuitry 50 that converts incoming power to welding power. Although three-phase power is illustrated as being provided to the power conversion circuitry, the present invention contemplates that the welding power supply may receive three-phase power or single-phase power as desired. In operation, the welding system may have power factor correction circuitry, such as that described in U.S. Pat. No. 5,601,741, which is hereby incorporated into the present disclosure by reference. Moreover, the welding power supply will typically be coupled to the grid through internal power distribution components (not illustrated), such as for circuit protection, circuit interruption, etc.

The power conversion circuitry 50 operates to convert the incoming power to power suitable for the welding operation. As will be appreciated by those skilled in the art, such operations may be based upon the application of power to the torch and to a workpiece, in the form of direct current power, alternating current power, pulsed power, etc. Moreover, many different welding regimes and protocols may be accommodated, such as constant current processes, constant voltage processes, etc. The power conversion circuitry 50 operates under the control of control circuitry 52. The control circuitry will typically include one or more processors, on-board or separate memory circuitry, etc. The control circuitry also includes sensing devices that allow for sensing at least one of a current and a voltage of the incoming power. The control circuitry may also be capable of calculating an input real power, or input apparent power and/or an input phase angle. The control circuitry further include sensing devices that allow for sensing at least one of a weld current, voltage and power output by the power conversion circuitry. Although not separately illustrated, the control circuitry also will typically include operator interface devices that allow for selection of particular operations, selection of weld settings, selection of currents and voltages, selections of polarity, etc. The interface may also provide user feedback (typically through a user-viewable display), of particular settings, energy utilization, etc.

The embodiment of FIG. 2 also includes a Smart Grid interface 54 that is in communication with the control circuitry 52. In the embodiment illustrated, the interface 54 is incorporated in the welding power supply, although this interface could be a separate device. The Smart Grid interface may, moreover, be defined by programming in the same memory and processor structures of the control circuitry 52, or separate memory and processor capabilities may be provided (such as on a dedicated Smart Grid interface board provided in the power supply). The Smart Grid interface allows for monitoring for power parameters before, during and after welding operations. By way of example only, the Smart Grid interface may collect data regarding currents, voltages, peak power utilization, duty cycles, power draw times, power factor, etc. Such data may be stored in Smart Grid interface for exchange with an external Smart Grid interface 56. The data may also be used to control or influence the operation of the welding power supply. Smart Grid interface 56 will typically be provided on the grid-side, such as in the independent system operator 20, the Smart Grid control/monitoring entity 22, or one or more of the energy producers or distributors. The Smart Grid interface 56 may, in accordance with presently established and future Smart Grid standards, provide an indication to the welding power supply of available power, power costs, etc. that allow for more intelligent utilization of the welding power supply in performing welding operations. On the other hand, the cooperation of the Smart Grid interface 56 with interface 54 may allow for communication to the grid-side power provider of information regarding the present weld settings, such as voltages, currents, power draw, as well as dynamic information, such as actual power utilization during welding operations, settings the control of the ramp up or ramp down of power at the initiation and at termination of a welding arc, etc.

Figure 3:
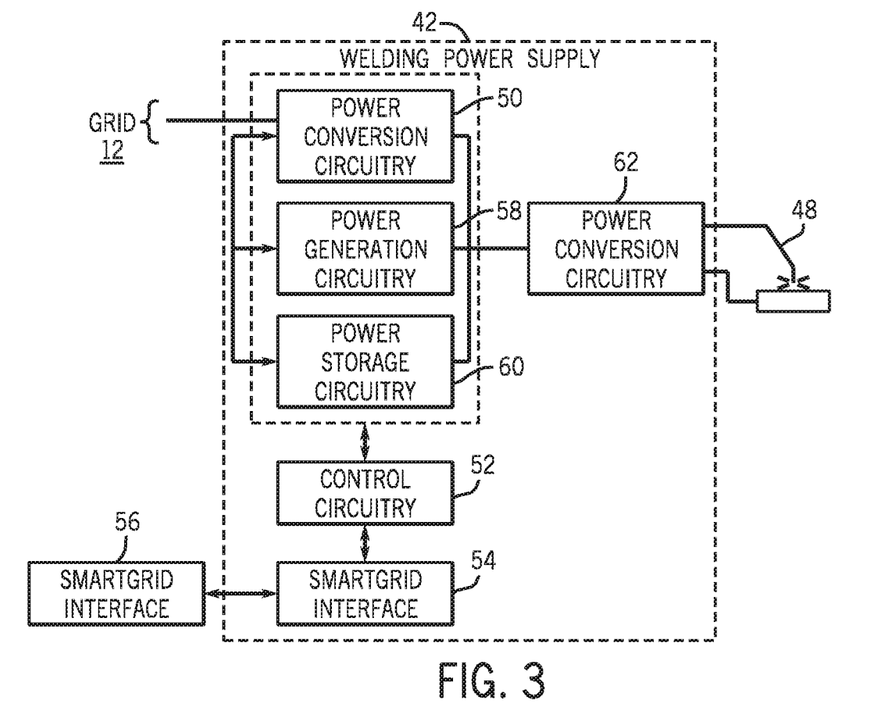
FIG. 3 is a similar diagrammatical representation of welding power supply that includes power generation and power storage circuitry (e.g., a hybrid systems) designed to communicate with a Smart Grid interface.

FIG. 3 illustrates a further embodiment of a welding power supply 42 that includes power conversion circuitry 50 as well as power generation circuitry 58 and power storage circuitry 60. In certain contexts, the welding power supply may include both power generation circuitry 58 and storage circuitry 60 or only one of these. Like the power supply described in connection with FIG. 2, welding power supply 52 of FIG. 3 allows for the receipt of power from the power grid and its conversion to power suitable for welding operations. In the embodiment of FIG. 3, however, because multiple power sources are available, power conversion circuitry 62 may be included that allows for conditioning of the weld power output by the power supply. All of the power conversion circuitry 50, the power of generation circuitry 58 and the power storage circuitry 60 may be jointly controlled by control circuitry 52 that is, as before, coupled to a Smart Grid interface 54.

The system of FIG. 3 may be considered a "hybrid" in so much as it allows for drawing of power from the power grid as well as from alternative sources, such as power generation circuitry 58 and power storage circuitry 60. In presently contemplated embodiments, the power generation circuitry 58 may include, for example, engine-driven generators, fuel cells, etc. The power storage circuitry 60 may include batteries, capacitors, super capacitors, etc. The availability of power generation circuitry and power storage circuitry allows for a wide range of options in the operation of the welding power supply. For example, under normal conditions, the power conversion circuitry 50 may receive power from the grid and output the desired welding power for a welding operation 48. Based upon such factors as grid stability, available power, cost of power from the grid, etc., the control circuitry 52 may initiate operation of the power generation circuitry 58 (e.g., by starting a generator engine) to provide some or all of the power necessary for welding. Similarly, based upon the grid conditions power may be drawn from (or stored in) power storage circuitry 60.

Many different scenarios may be envisaged and are enabled by the arrangement of FIG. 3. For example, because the onset of power draw by the welding operation may be relatively sudden from the standpoint of the power grid, control circuitry 52 may initially call for the draw of power from the power storage circuitry 60, and/or from the power generation circuitry 58. Controlling transitions at the startup and determination of the initiation of the welding arc may thus reduce the rate of change of power draw from the grid. The arrangement also allows, where desired, for substantially smaller power generation circuitry 58 (e.g., a smaller engine and/or generator) as well as for the exchange of power between the power conversion circuitry 50, the power generation circuitry 58 and the power storage circuitry 60. That is, during periods of power draw for welding operations, some or all of the power may be drawn from the grid or from the other sources, Depending upon the duty cycle of the welding operation, then, when the welding is not ongoing, the power storage circuitry 60 may be recharged by power from the grid or power from the power generation circuitry 58. Automation in the switching between sources of power for the welding operation is also envisaged. Thus, an operator may allow for such alternative power draw, or the system may be designed to function in this way without operator intervention, Ideally, the source of power and the switching between sources of power is essentially invisible to the operator such that the welding operation may be performed in a conventional manner, while allowing for accommodation of grid conditions, grid needs, etc. Control circuitry 52 and Smart Grid interface 54, may also coordinate the flow of power back to the grid from power generation circuitry 58 and/or power storage circuitry 60. In this way, welding power supply 42 can become and alternate source of power for the Smart power grid during times of peak demand, Power storage circuitry 60 may also be used to store power from the Smart grid during times of low power demand as determined from Smart Grid control entity 22 in FIG. 1.

Figure 4:
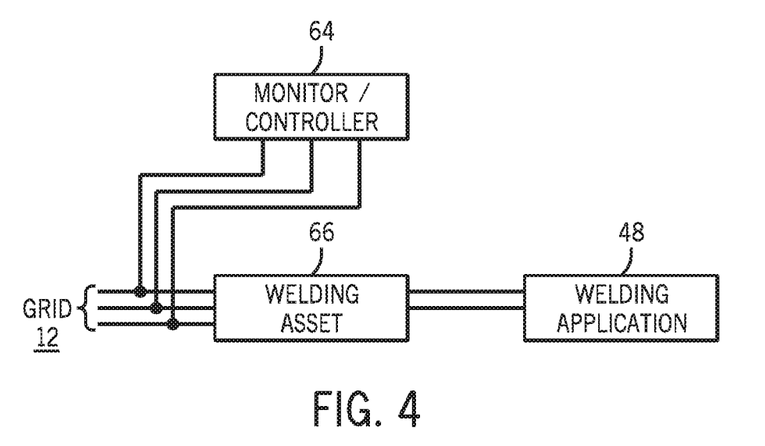
FIG. 4 is a diagrammatical representation of a system that might include an external monitor and controller.

FIG. 4 is diagrammatical representation of a variant of the embodiments of FIGS. 2 and 3. That is, an external monitor/controller 64 may be coupled to a welding asset 66 and monitor at least some of the conditions of the welding asset. Moreover, the monitor/controller, as an external component, may be coupled to existing welding assets to make the functionality and benefits described herein back-compatible to existing welding systems.

It should also be noted that any and all of the benefits and functionalities described above may be attained at different scales based upon welding system topographies of the type illustrated in FIG. 1. That is, in the same way as power flow can be controlled in the embodiment of FIG. 3, at a different scale or level, similar or identical control may be attained. For example, based upon information exchanged between the Smart Grid welding system and the independent system operator, the Smart Grid control/monitoring entity, the producers or distributors, welders may be programmed to operate in particular ways, such as to control power draw, control the rate of change of power draw, etc. Moreover, at certain times of the day or night, the grid operators may indicate a reduction of power costs that may be used for planning purposes in production settings. Where possible, for example, high powered-utilization welding applications, both manual and automated, may be scheduled at times at which energy costs are reduced, typically at off-peak evening and night hours. In such settings, moreover, both planned and emergency use of internal power production assets and energy storage assets may be controlled based upon data exchanged with the grid management entities.

Figure 5:
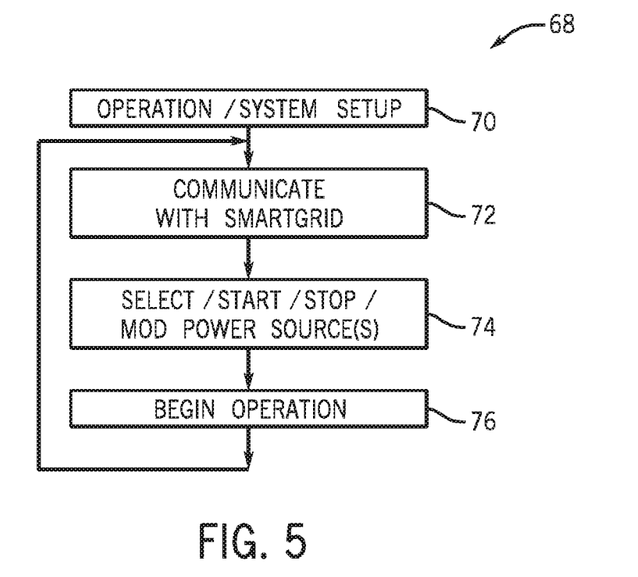
FIG. 5 is a flow chart illustrating exemplary steps in logic for performing welding applications in communication with a Smart Grid

FIG. 5 represents exemplary logic for performing welding operations in a Smart Grid setting, as well as for operations that may be performed by virtue of the Smart Grid connectivity with the power supply. The logic, designated generally by reference numeral 68, will typically begin with the setup of the welding (or similar) system as indicated at step 70. The setup will often include selection of a welding process, selection of weld settings, fixturing and fitting, engineering of repetitive welding operations, scheduling of automation systems and human operators, etc. At step 72, then, an individual welding power supply, a Smart Grid component coupled to such a welding supply, or a component coupled to any stage of a manufacturing process may communicate with Smart Grid operators. As noted above, such communication may include an indication of available power, power constraints, utilization recommendations, power costs, etc from the grid operators. Communications back to the grid operator may include information relating to welding processes, anticipated power needs, anticipated duty cycles, anticipated power draw onset and termination ramp rates, etc. It should be noted, however, that where desired, the welding system may operate based upon data exchanged via the Smart Grid interface at all times that the system is coupled to the Smart Grid (that is, whether a welding operation is set up or ongoing, or not).

At step 74, then, the welding operations may be performed. Such operations are typically performed by initiating welding arcs and continuing power draw in accordance with a desired welding protocol to establish one or more welded joints. As noted above, the operation may, in addition to or instead of forming weld joints, entail the application of heat to a weldment or to one or more work pieces, cutting of one or more work pieces, etc. Actual operation indicated at step 76 includes the establishment of arcs, the draw of power, etc based upon the setup and the welding system itself. However, it should be noted that at step 74, the welding system and other equipment may generate power, utilize stored power, or convert and transfer power from the grid or from a demand-side power source to power storage equipment, etc.

Prior to termination of the welding operation the system may continuously exchange data with the Smart Grid operators to alter operation of the welder or any other power equipment associated with the welder. That is, as the operation continues, information relating to the draw of power, the voltage and current levels, power factor, etc may be communicated from the welder or the welder installation to the Smart Grid operators, and data relating to the condition of the grid may be communicated back to the welder or the welding installation. Such communication may continue until termination of the operation. Moreover, as mentioned above, the operation of the welding system may be based upon data exchanged with the Smart Grid even prior to or after a particular welding operation. For example, the Smart Grid data may prompt the system to start engine-generator to provide additional peaking power to the grid as needed. The Smart Grid may also decide when to charge batteries and when not to. Other operations may enable power factor correction, power flow to or from the grid, staging of system operation, etc. Many such functions, both presently contemplated and later developed will be enabled by the Smart Grid connectivity.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply comprising:
power conversion circuitry configured to receive power from a power grid and to convert the power received from the power grid to welding power suitable for a welding operation;
a grid interface configured to transmit data to, and receive data from, a grid-side monitor or controller in one or more components of an energy producer or distributor; and
control circuitry coupled to the grid interface and configured to control operation of the power conversion circuitry based at least partially upon the data received by the grid interface from the grid-side monitor or controller.

2. The welding power supply of claim 1, wherein the data received by the grid interface from the grid-side monitor or controller comprises power demand data, power availability data, or power pricing data, and the control circuitry is configured to schedule the welding operation for a time when power demand is low, power pricing is low, or power availability is high.

3. The welding power supply of claim 1, further comprising an energy storage device configured to store energy for use by the welding operation, wherein the control circuitry is configured to control charging or discharging of the energy storage device, based at least partially upon the data received from the grid-side monitor or controller.

4. The welding power supply of claim 2, wherein the control circuitry is configured to command the power conversion circuitry to draw power partially, or proportionally, from the energy storage device or the power grid based at least partially upon the data received from the grid-side monitor or controller.

5. The welding power supply of claim 2, wherein the control circuitry is configured to control charging or discharging of the energy storage device, or drawing power from a generator or the power grid, based at least partially upon a welding schedule and the data received from the grid-side monitor or controller.

6. The welding power supply of claim 5, wherein the welding schedule comprises a plan for charging or discharging the energy storage device, or drawing power from the generator or the power grid, based on power-related data.

7. The welding power supply of claim 5, wherein the welding schedule is received via an operator interface.

8. The welding power supply of claim 1, wherein the data transmitted to the grid-side monitor or controller comprises power-related data, the power-related data comprising one or more of a power need of the welding power supply or a power utilization of the welding power supply.

9. The welding power supply of claim 1, wherein the data received from the grid-side monitor or controller comprises power-related data, the power-related data comprising one or more of a past power demand, present power demand, power availability, power factor related information, or power pricing.

10. The welding power supply of claim 1, wherein the control circuitry is configured to coordinate a flow of power from the welding power supply to the power grid based at least partially upon the data received by the grid interface from the grid-side monitor or controller.

11. A method comprising:
receiving power from a power grid in a welding power supply;
transmitting data from a grid interface associated with the welding power supply to a grid-side monitor or controller in one or more components of an energy producer or distributor;
receiving data from the grid-side monitor or controller in the grid interface; and
controlling conversion of the received power into welding power suitable for a welding operation based at least partially upon the data received from the grid-side monitor or controller.

12. The method of claim 11, wherein the data received in the grid interface from the grid-side monitor or controller comprises power demand data, power availability data, or power pricing data, the method further comprising scheduling the welding operation for a time when power demand is low, power pricing is low, or power availability is high.

13. The method of claim 11, further comprising storing energy for use by the welding operation in an energy storage device, and controlling charging of the energy storage device, discharging of the energy storage device, or both, based at least partially upon the data received from the grid-side monitor or controller.

14. The method of claim 13, further comprising drawing power partially or proportionally from the energy storage device or drawing power partially or proportionally from the power grid based at least partially upon the data received from the grid-side monitor or controller.

15. The method of claim 13, further comprising controlling charging or discharging of the energy storage device, or drawing power from the generator or the power grid, based at least partially upon a welding schedule and the data received from the grid-side monitor or controller.

16. The method of claim 15, wherein the welding schedule comprises a plan for charging or discharging the energy storage device, or drawing power from the generator or the power grid, based on power-related data.

17. The method of claim 16, further comprising receiving the welding schedule via an operator interface of the welding power supply.

18. The method of claim 11, further comprising transmitting power-related data to the grid-side monitor or controller, the power-related data comprising one or more of a power need of the welding power supply or a power utilization of the welding power supply.

19. The method of claim 11, further comprising receiving power-related data from the grid-side monitor or controller, the power-related data comprising one or more of a past power demand, present power demand, power availability, power factor related information, or power pricing.

20. The method of claim 11, further comprising coordinating a flow of power from the welding power supply to the power grid based at least partially upon the data received from the grid-side monitor or controller.

* * * * *